(12) United States Patent
Ricci

(10) Patent No.: US 12,448,155 B2
(45) Date of Patent: Oct. 21, 2025

(54) SYSTEM FOR THE MANAGEMENT OF LOADING AND UNLOADING OPERATIONS OF UAV

(71) Applicant: Francesco Ricci, Santarcangelo di Romagna (IT)

(72) Inventor: Francesco Ricci, Santarcangelo di Romagna (IT)

( * ) Notice: Subject to any disclaimer, the term of this patent is extended or adjusted under 35 U.S.C. 154(b) by 66 days.

(21) Appl. No.: 18/238,764

(22) Filed: Aug. 28, 2023

(65) Prior Publication Data

US 2024/0059433 A1 Feb. 22, 2024

Related U.S. Application Data

(63) Continuation of application No. PCT/IT2022/050051, filed on Mar. 11, 2022.

(30) Foreign Application Priority Data

Mar. 11, 2021 (IT) .................. 102021000005732

(51) Int. Cl.
*B64U 10/13* (2023.01)
*B64U 101/30* (2023.01)
*B64U 101/60* (2023.01)

(52) U.S. Cl.
CPC .......... *B64U 10/13* (2023.01); *B64U 2101/30* (2023.01); *B64U 2101/60* (2023.01); *B64U 2201/104* (2023.01); *B64U 2201/20* (2023.01)

(58) Field of Classification Search
None
See application file for complete search history.

(56) References Cited

U.S. PATENT DOCUMENTS

| | | | |
|---|---|---|---|
| 9,422,139 B1* | 8/2016 | Bialkowski | B66C 13/06 |
| 9,573,684 B2* | 2/2017 | Kimchi | B64D 1/12 |
| 2017/0090484 A1* | 3/2017 | Obaidi | G06Q 30/0185 |
| 2018/0364713 A1* | 12/2018 | Foster, II | G08G 5/26 |
| 2019/0114578 A1* | 4/2019 | Afordakos | G06Q 10/08355 |
| 2019/0161190 A1* | 5/2019 | Gil | B64D 1/22 |
| 2019/0263521 A1 | 8/2019 | O'Brien et al. | |
| 2021/0280074 A1* | 9/2021 | Ali | H04L 9/3236 |

OTHER PUBLICATIONS

International search report, corresponding application No. PCT/IT2022/050051, Aug. 7, 2022, 3 pages.

* cited by examiner

*Primary Examiner* — Peter D Nolan
*Assistant Examiner* — Demetra R Smith-Stewart

(57) ABSTRACT

A system and method for directing unmanned aerial vehicles (UAVs) with respect to virtual segregated areas to guarantee safety levels. A host platform, upon receiving a request for delivery of goods from merchant to customer, transmit delivery instructions to a UAV, which is configured, upon arriving at a specified loading area, to: maintain a minimum elevation above the loading area; perform a recognition hand-shake with a merchant device; direct lowering of a winch to receive a load; and confirm a weight of the received load with respect to a maximum weight. Upon arriving at a specified delivery area, the UAV maintains a minimum elevation above the delivery area, performs a recognition hand-shake with a customer device, directs lowering of the winch to deliver the load, and confirms removal of the load, at least via a sensed weight applied with respect to a mobile hold.

20 Claims, 8 Drawing Sheets

Random generated

CRO  | 1 | 3 | 9 | 2 | 4 | 4 | 7 | 6 | 0 | 5 | 3 | 8 | 0 | 2 | 3 | 1 |

First example Random determinated

Date        Time        GPS- DM                        Order

<u>12</u>   11  2022   10,<u>31</u>   41 53 <u>41380</u>   12  29  53356   <u>2378</u>

CRO  | 1 | 2 | 3 | 1 | 4 | 1 | 3 | 8 | 0 | 1 | 2 | 2 | 9 | 3 | 7 | 8 |

2nd example Random determinated

Date        Time        GPS- DM                        Order 12   11  <u>2022</u>   <u>10,31</u>   <u>41 53</u> 41380   12  29  53356   <u>2378</u>

CRO  | 2 | 0 | 2 | 2 | 1 | 0 | 3 | 1 | 4 | 1 | 5 | 3 | 2 | 3 | 7 | 8 |

*FIG. 4*

SYSTEM FOR THE MANAGEMENT OF LOADING AND UNLOADING OPERATIONS OF UAV

CROSS-REFERENCES TO RELATED APPLICATIONS

This application is a continuation of International Application Number PCT/IT2022/050051, filed Mar. 11, 2022, and further claims benefit of Italian Patent Application No. 102021000005732, filed Mar. 11, 2021, each of which are hereby incorporated by reference in their entirety.

BACKGROUND

The present invention relates generally to a system and method for the management of loading and unloading operations of remotely piloted unmanned aerial vehicles (UAVs).

Globally, the possibility of using drone platforms to perform delivery, or pick and delivery, services is gaining ground. The drones, more properly called UAVs, represent fast, economical, and low environmental impact solutions. At least for these reasons, drones represent a valid solution in competition with systems delivery by road.

Obviously, the economy of the system follows the obligatory step of automation. In fact, this case has been reached due to the implementation technologies of these systems, a technical degree of advancement that allows the drones to work in complete automation minimizing the need for human control during the execution of the various phases of assigned missions.

Also, no less important is the issue of security that these systems must inherently maintain. Although drones can be not heavy and limited in size, in case of accidents, during the flight can cause serious damage to persons and property. For example, these aircraft can reach speeds of beyond 120 km/hour, and even at much slower speeds their mass, even if only a few kg, can cause considerable damage. Even a 150 Joule impact can cause fatal injuries to a person. Even worse, these drones in some situations can be used as an improper weapon by ill-intentioned.

At least for these reasons, it is imperative that these systems are safe from all points of view. We can therefore only speak of systems that contain cutting-edge technological solutions both in terms of active safety and passive, both for the continuous and constant remote verifies to which they are subjected. Some might mistake these means as toys for playful activities; instead, it is the exact opposite. To meet these needs, it is more correct to speak of aeronautical solutions which, due to the universality of technologies adopted in the most varied and disparate fields, represent the avant-garde of technology. In this context, Italian patent reference 1428668 (by the present applicant) teaches, in turn, particular solutions for the safety and control of aircraft during the various operational phases of the drones. With the evolution of regulations and therefore with the development of new needs that have arrived on the market, further implementation is necessary with regards to safety and the automation possibilities that become necessary.

BRIEF SUMMARY

As mentioned above, delivery or pick and delivery by drones will presumably become even more popular. Currently, these services are intended for particular needs of immediacy and speed—fundamental characteristics for life-saving missions. In the above cases, the cost matter is generally irrelevant. Currently and mainly for security reasons, in the case of services with a very high added value, the performance of various missions takes place respecting particular conditions and schedules that in the case of massive use would make the service too expensive.

It happens in fact that these transports both are organized, point by point, from particular areas to other particular areas subject to particular safeguards and controls by the parties involved in the transport. In this case, the operations are too laborious and expensive; the collection of goods takes place with the vehicle off, with the hold or the anchoring means ready for loading of the goods to be transported and, once the drone has been loaded, the operator assigned to load moves away, the pilot then prepares to start the drone, guiding it towards the destination where other people are ready to receive the new delivery.

Once arrived at its destination the drone lands in the assigned and manned area, is turned off, and set up for the collection of the transported goods for the recipient. As it is easy to guess, we are in the presence of considerable expenditure of energy given all the accessory services implemented for the operated service. This system certainly cannot be said to be suitable for massive use. From a trivial calculation referable to a point-to-point mission, it is easy to understand that to make a transport lasting twenty to thirty minutes is necessary to segregate the areas of take-off and landing, organize in these areas the assistance of qualified personnel, organize Guide & Management infrastructures in a such an impressive way that an hour of flight, wanting to be conservative, will reasonably have a cost in the order of 500 to 1000 euros. The above is for the personnel in charge of the areas for the flight personnel and for the management of the driving and control infrastructure. Costs of this kind in the case of life-saving transport are not prohibitive but, in the case of transport competing with the road transport for the transport of goods of common use, these values will be unacceptable too expensive. The above services are performed, with the purpose of ensuring the full security of the mission.

With this premise, it is necessary while maintaining the required safety levels by national and international regulations, plan highly automated systems where human intervention be limited. It would be desirable to implement a system that oversees the operational phases through an automatized superintendent who controls dozens of drones in flight simultaneously. Simply put, a system and method as disclosed herein lends itself to using artificial intelligence systems in deep learning that allows for improvement constantly operation by building on previous missions. Such a system will autonomously increase its own experiences and knowledge, limiting more and more human intervention in the functions of flight controllers, predictive maintenance of aircraft and any solution operations to be implemented in the event of failures of the various systems.

In any case, to set up highly automated systems, the applicant believes that contexts and precautions exist which must be implemented independently from the automation that will be achieved. The intended application will go to manage delivery or pick and delivery operations in urban areas in the absence of areas segregated suitably prepared. The above sentence demonstrates the technological challenge to be met by using drones for this purpose. The applicant thought to fit these security needs that the solution is to never land the drone used for the pick and delivery missions. To land and operate these drones at head height in urban areas, in absence of barriers, is strongly inadvisable.

These drones, despite being equipped with a sump to repair from the propellers, could in some cases prove inadequate and represent for people who are in the immediate vicinity, a danger to their safety. Aside from the drop weight, these drones are equipped with propellers up to 32" long which can turn at extreme speeds up to 7000-8000 revolutions per minute (rpm). Such high propeller rotation speeds are a danger to things and people if the situation is not suitably mitigated. In this sense, it was thought a system where the drones to be used, during the gripping phases or delivery, remain suspended in flight by carrying out loading and unloading operations by properly doing lower the cargo hold. The minimum height in question must always be kept under control with the drone's onboard altimeter and can never be less than that necessary for the ballistic parachute to carry out its function. The above in case of failure, to have a slight descent of the drone suitable for safety needs required in terms of speed of fall and force of impact. The hold for this purpose must be utilized according to a particular management algorithm and must have some particularities that allow compliance with the mission characteristics about the weights and to the dimensions to make possible the embark of the goods. In the case in question, a hold having the size 40×40×40 cm is housed in the lower part of the drone between the two supports. The descent and ascent of the hold are operated using suitable winches equipped with cables, which can be made of various materials: from braided steel to cables nylon, any natural and/or synthetic fiber of adequate capacity and length. In the case in question length is 12 meters and load capacity of at least 15 kg. The winch likewise is equipped with an apparatus for determining the transportable weight that is necessary to respect the maximum weight that the drone must have during its mission, for the type of drones considered, up to a maximum take-off weight of 25 kg.

This last aspect of the determination of the transportable payload is particularly important given the fact that the limitations that the law imposes on the classification of missions require precise weight respect, the lack of which would cause loss or fine also in the case of checks by the competent bodies. In this case very heavy fines up to the cancellation of the license authorizations to fly. The sanctions would be very heavy because we are in the aeronautical sector and in this case could be applied the rules of the navigation or aeronautical code.

With these characteristics, the drone and/or its platform must also guarantee further performance and that is to communicate constantly with the parties involved in the delivery or pick & delivery operation. It must be assured constantly info about the flight specifying the meeting point where the loading and unloading operations will be carried out. These operations are to better organize the execution of the mission without delays to ensure only to the authorized person the unloading and loading operation at the meeting point area. The same information to perform the missions at the precise and agreed time and position.

Moreover, the set of messaging so implemented makes easier landing operations during the approach in the areas assigned to the drone in the correct and pre-established point in the verti-port. In this case, we are talking about shelter infrastructures where the drones receive various operations of maintenance and where they are parked during periods of non-use. In these vertiports, the drone will always arrive there based on the mission and the assigned path where always in an automated way the drone will be received and managed in the various maintenance phases, recharging battery packs, tightening screws, replacing firmware update engines, and even extending to cleaning.

BRIEF DESCRIPTION OF THE SEVERAL VIEWS OF THE DRAWINGS

FIG. 4 schematically represents practical examples for the production and/or determination of a unique code.

DETAILED DESCRIPTION

Various embodiments of a system and automated method as disclosed herein may be implementing for transport of goods and other things, using UAVs (drones) with the aim to guarantee safety and certainty in the various pick-up and delivery operations. Such systems and methods are illustrated in a preferred embodiment according to the above-referenced diagrams and graphs. These example representations describe an invention sufficiently so that the skilled person can easily put it into practice, but this does not imply any limitation in this regard, also specifying that any logical, mechanical variation can be made without going out of the scope of protection of this application.

In this sense, a glossary of the terms used herein may be as follows:
 CLI—Client, for example a client device, platform, or the like associated with a shopkeeper (merchant);
 UT—End-User/End Customer (purchaser);
 PeC—E-commerce platform;
 GM—Guide and management;
 PPDD—Platform for Pick & Delivery via drones;
 D-Flight—National Flight Control Body—DRONE Division.

One of skill in the art will also appreciate how the systems and methods can be implemented by a set of software or hardware solutions or by a mixture of software and hardware solutions.

Below is an illustrative description of the technical steps and operations necessary to implement the service, and in particular to concretely implement the invention. In various embodiments of a method, steps and procedures as described below may be carried out in whole or in part, and potentially some steps being omitted or in varying order, depending on the service requested and the contingent situation to be faced. As it is logical that, for example, the registration functions to the service will not be repeated for subsequent repeated missions or, in another situation, the withdrawal operations will not be performed when the service be implemented directly from the client warehouses. In the latter case the client may be equipped with said warehouse infrastructure of its own so that the drones can leave for the mission avoiding the withdrawal to carry out then the respective deliveries.

Figure 1:
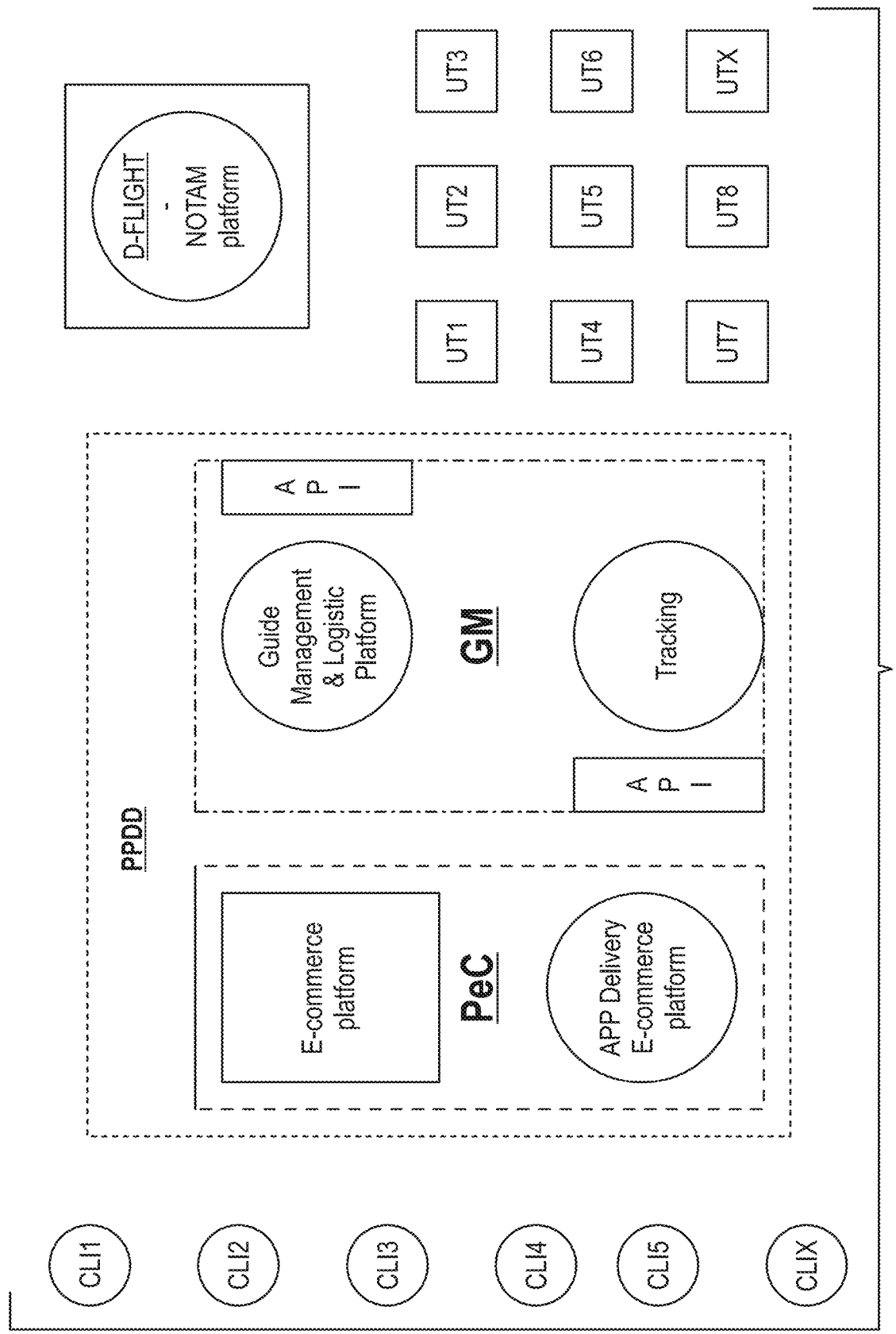
FIG. 1 is a block diagram representing an embodiment of a system.

The various phases of a mission may be described from collection to delivery by explaining an algorithm as represented by the block diagram of the system in FIG. 1. On the left of the diagram is an eCommerce platform, in the center is a host platform for guide management and logistics, and on the right is the D-Flight platform, collectively managing a flow of operations for collection and delivery.

First, a purchase phase of an exemplary method is described herein.

The purchaser registers on the PPDD drone service platform by completing all the recognition operations up to the SCA (Strong Customer Authentication) operations.

The purchaser receives the credentials to access the PPDD services on the web portal or through an appropriately prepared app.

The purchaser connects to the clientent website. The merchant, in turn, registered as a supplier on the PPDD platform, and in e-commerce or with a prepared app, checks the availability of the items of interest in the warehouse storage (the clientent, whose e-commerce portal could be owned by the merchant or a user of the e-commerce service provided by the PPDD).

The purchaser carries out the order of the item by choosing the PPDD system for receiving the order on the clientent e-commerce portal.

The purchaser communicates to the clientent the date, timing, and other information (e.g., address or coordinates) for the delivery of the desired goods.

The clientent connects to the PPDD system and communicates the purchaser request in the required ways.

The PPDD, in turn, performs internal checks on the availability of means to perform the service in real-time.

The PPDD in parallel requests approval of the mission by communicating the methods of execution, route, and timing, to the DFlight air control platform.

D-Flight accepts, or not, the transport request and, if so, validates it by responding in real-time to the PPDD by communicating the relative Notice to Airman (NOTAM). In the NOTAM all the information of the assigned slot may be provided, such as the coordinates of the route to follow and the timing to be respected by the drone.

The PPDD platform confirms the mission to the clientent and the purchaser by sending them a link for tracking respectively containing the relevant code (CRO) of the mission.

The client pays for the service that will be provided.

The client accepts the mission in turn and asks the purchaser to pay for the service.

The ordering of the service is concluded with the payment phases and is immediately prepared for the subsequent mission by the PPDD.

Second, a phase of preparation of the asset of the exemplary method may be described herein.

The client prepares the goods to be delivered.

The PPDD platform organizes the drone for transport by providing it with the instructions as per NOTAM.

The PPDD announces the next execution of the mission to the purchaser and the client.

The PPDD prepares the drone by making it arrive in the take-off area of the verti-port awaiting the mission execution command.

Once the mission is confirmed, the PPDD starts the drone in the direction of the client/supplier.

The PPDD begins to communicate to the client and the purchaser the start of the mission and the expected arrival at the various pre-established meeting points.

The PPDD sends various reminders to the client and the purchaser until the drone arrives at the predetermined point and where the PPDD with the last message sends this info and a triggering message to the drone and the app of the client via Bluetooth probes on the drone and smartphone when not already on.

The above as refinement operations of the meeting point position.

A third phase of the exemplary method may next be described herein as a withdrawal phase.

The client, with its app at its disposal, meets at the agreed-upon meeting point with the drone, which remains suspended in flight at a safety height according to the characteristics of the parachute.

The client communicates the CRO from its app to perform a handshake operation with the drone.

The hand-shake is established. Based on the contingencies or any occupations of the meeting point area originally established by third parties, the drone may follow the client to a newly accessible area for the loading operation.

The client confirms the pickup and asks the drone to implement a descent of the hold.

The drone, while maintaining the position in the air, e.g., at a height of at least eight meters, lowers the hold to, e.g., the typical height of a person.

The client releases the goods being transported in the hold, which must be of adequate size and weight.

The drone checks the weight loaded in the hold using a scale connected to the winch, and if the measurement corresponds to the flight parameters:

The client confirms the deposit in the hold of the goods to be collected from the drone and gives the GO for the mission.

The drone picks up the hold and prepares for the delivery of the goods to the purchaser.

The drone communicates the confirmation of the withdrawal to the PPDD and begins the journey towards the purchaser.

A fourth phase of the exemplary method may next be described herein as a delivery phase.

The purchaser, with its app at its disposal, meets at the meeting point agreed with the drone, with the goods onboard, and which remains suspended in flight at a specified or otherwise useful safety height based on the characteristics of the parachute supplied with the drone.

The purchaser communicates the code (CRO) from its app to perform a handshake operation with the drone.

The hand-shake is established. Based on contingencies or any occupations of the area of the meeting point originally established by third parties, the drone may follow the purchaser to a new usable area for the delivery operation.

The purchaser confirms the interest in the delivery and asks the drone to release the hold.

Maintaining a position in the air at a height of, e.g., at least eight meters, the drone drops the hold up to, e.g., the typical height of a person, making it available for the collection of the goods contained inside.

The purchaser removes the goods to be delivered from the hold.

The drone verifies that the good has been removed by verifying the zero-weight using the scale connected to the winch.

The drone and/or the purchaser confirms the delivery to the PPDD of the goods being transported and so the drone causes the hold to ascend.

In the absence of further instructions from the PPDD, the drone begins its return path to the verti-port and lands in the designated landing area.

The Drone lands in the space provided for the installation of the verti-port and is turned off.

Drone management and preparation may take place in the verti-port, a conglomerate infrastructure where dislocated areas may be provided for specialized and organized as data-rooms for remote driving and control drones, stowage for the goods to be transported, and drone maintenance.

The verti-port may further be configured for powering and recharging drones in addition to the areas just described. However, there are, as will be better seen, areas used by drones as a shelter or collection center for the drones themselves. These additional hospitalization areas are especially used during the hours of non-use or stoppage of the service or used for carrying out, as indicated above, recharging operations, routine maintenance, and other tasks necessary for the proper functioning of the drones. It was therefore considered to place the drones inside a single structure and have them arrive automatically at their designated stall, after a mission. In addition to requesting technological solutions for the very precise positioning, with a few centimeters of allowed tolerance, requires, for safety reasons, reserved stalls for each drone with considerable size, in the order of several tens of square meters. The drones considered by the applicant cover an area with a diameter of about three meters. Given this, it was assessed that to provide operating flotillas of drones in large numbers means having available very large sheds of adequate height, with an eye toward the study of further solutions that allow a more careful use of the spaces available. In Italy, for example, these evaluations must be carefully considered, given the frequent lack of available space. In this sense, the applicant has thought of a system where it is possible to organize adequately in an automated manner these infrastructures to support services in areas more limited by saving heavily on the consumption of land needed for the implementation of services.

Figure 2:
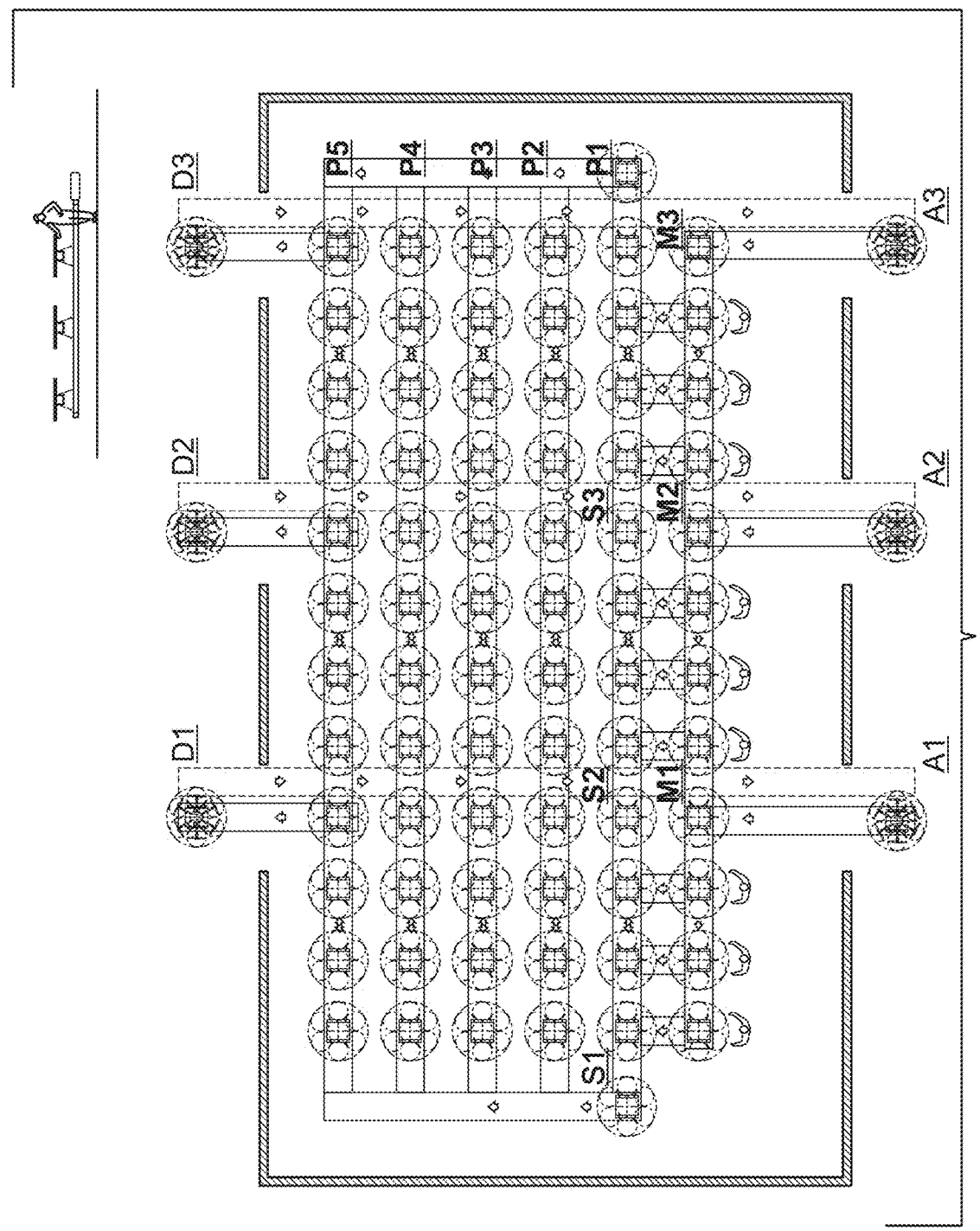
FIG. 2 is a diagram representing an embodiment of a verti-port layout.

FIG. 2 shows an exemplary layout relating to a plant for the management and organization on the flight, landing, take-off, and the various maintenance functions, of parking, storage, and repair of drones. The logic that governs this scheme is a very normal warehouse managed according to FIFO rules and accounts for the various needs of single and massive services. The system is scalable, designed for eventual growth by adding, from hand to hand, appropriate blocks according to the needs of service to be provided to the market. In this way be possible a simple and automated system may be provided in response to the needs of missions.

In a taxiing phase of the exemplary method, the fitting tape—A1, A2, A3—once the OFF MACHINE situation has been verified of the drone, transports the drone towards the inside of the verti-port and sends it towards the maintenance area of the flight platforms—M1, M2, M3.

In a maintenance phase of the exemplary method, the Drone, utilizing pre-arranged belts, arrives at the control stations where operators carry out the replacement of the batteries, the tightening of the screws, the verification of the technical capabilities of the motors up to replacement, software update, cleaning, etc.

Upon completion of the previous phase, the drone is sent to the section of stowage of drones in the dynamic parking area—S1, S2, S3.

In a dynamic parking phase of the exemplary method, once the drone has passed all the technological checks, it is transferred to the tapes of the dynamic parking—P1, P2, P3, P4, P5—which in FIFO situation will come second appropriate procedures for the next mission by moving up to the take-off belt—D1, D2, D3.

In a take-off phase of the exemplary method, the drone is positioned on the take-off belt and upon having verified its technical characteristics looks forward to receiving the NOTAM for the next mission.

The above algorithms are provided as an overall representation of an embodiment. Obviously, if the system is used only for delivery operations departing directly from a warehouse adjacent to the verti-port, the asset withdrawal operation, or third phase, is unnecessary and may be replaced by direct operations to load the goods to be transported directly in the hold with the drone off. Prepared in this way, the drone is made to derive on the selected belt of the verti-port from the PPDD for the delivery mission.

Further parts of the process may now be described which, through their use, express the novelty of a system and method as disclosed herein. At first sight this algorithm would seem to list some mechanical phases, known or obvious, for the execution of the various missions but as will be highlighted some solutions starting from known operations use in a particular and innovative way some of these phases so as to provide solutions that if not resolved would affect the safety, certification, economy and the possibility of automation of the processes that oversee the missions.

Such indices or parameters to be considered in even more detail may include a transaction reference code (CRO), for example using multi-factor verification.

The applicant, taking a cue from banking-derived technologies, in particular SCA (Strong Customer Authentication), deems it appropriate to implement these technologies also in the management of transport logistics using drones. The system must provide solutions to guarantee the exact fulfillment of the various procedures which, in addition to being the subject of a guarantee for the entire system, must be simple and easy to implement. Moreover, to allow automated procedures with an easy and safe user experience for the user. Precisely for these reasons the recognition, authorization, and certification of collection and delivery must deal with so-called double-factor recognition systems in 2FA jargon.

In the case in question, despite all the recognition phases that have previously been highlighted, further description may be provided as to how these 2FA checks are carried out. In an embodiment, the terminology CRO for the transaction reference code has been adopted. The CRO is a unique code that can be generated at various moments of the mission and can be randomly produced by a specific generator or can be generated as the sum of opportune deterministic choices, deterministic CRO, that is the choice of some information referring to the mission whose data are chosen according to particular pre-established schemes or logics. In some cases, the CRO could be determined further such as merging the random CRO with the deterministic CRO. In the case of deterministic CRO, the choice could take place according to some characteristics of the mission itself to have a talking coding, e.g., mixing various data taken all or in part from the complete code, among these for example the time of the precise order at second, the GPS coordinates, the date, the sequential number.

Figure 3:
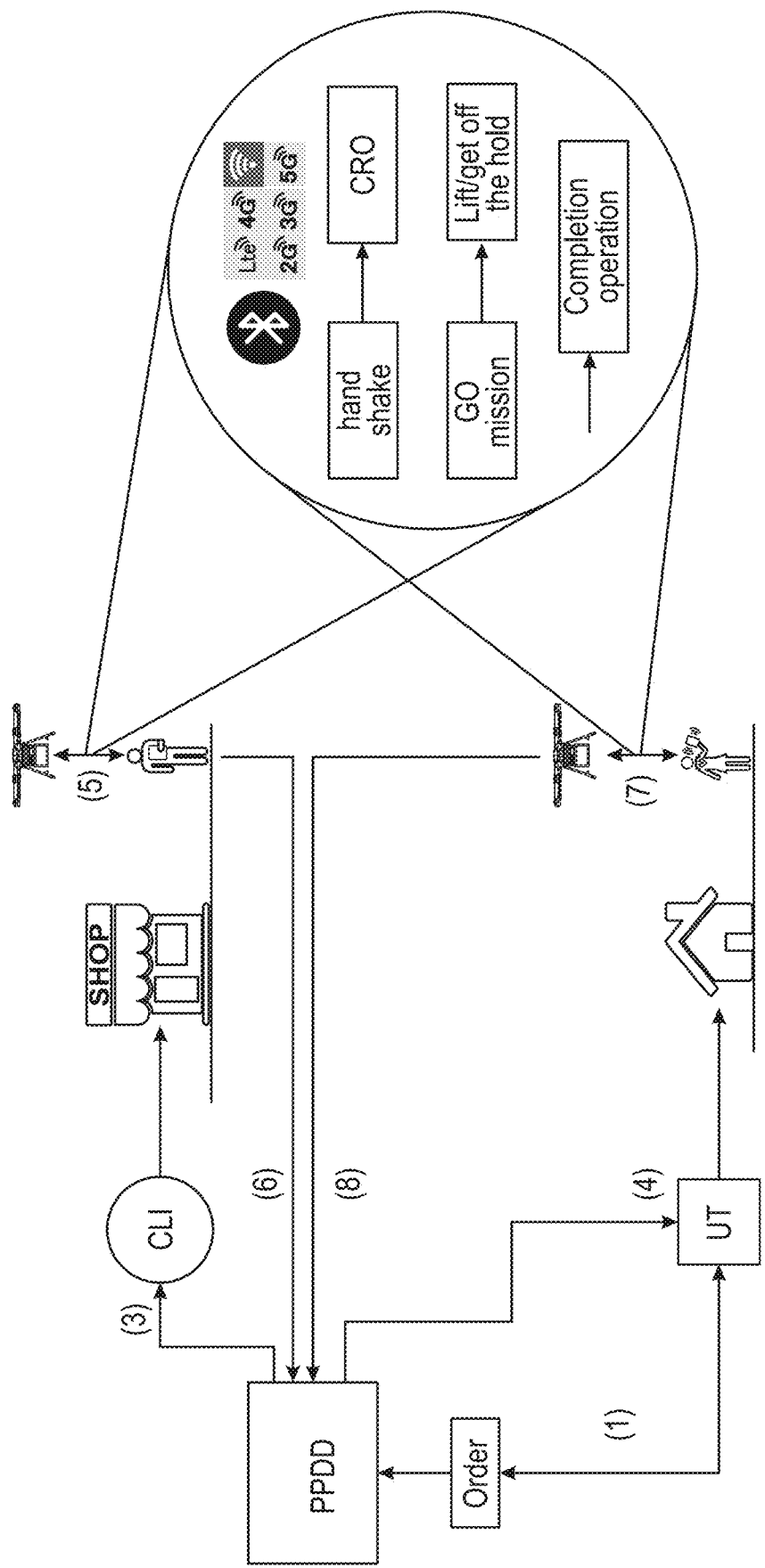
FIG. 3 is a block diagram representing exemplary functions of exchange of information and orders, in particular the communication of a unique code.

In this sense, see FIG. 3 which develops a block and detailed diagram relating to the functions of exchange of information and orders in particular the communication of the CRO, and FIG. 4 which schematically shows some practical examples for the production and/or determination of a CRO code.

The CRO, or the various CROs, as in the above cases as determined, is appropriately communicated by the PPDD, to the purchaser, and the client. The communication of this data can take place using one of the many transmission technologies available on the market such as the Internet, push notification, SMS, email, and the like. The purchaser and the client at the time of delivery or collection, to be recognized, must appropriately communicate the CRO code so that the identity of the person authorized to perform the related delivery or collection tasks can be certified.

Furthermore, the various CROs can be generated, depending on the setting provided to the system, communicated immediately when the order is generated, or they can be generated during the mission itself or immediately before the withdrawal or delivery phases.

These CROs are appropriately derived from the purchaser and client devices that will respond by communicating this data to be able to be recognized and therefore to appropriately allow loading or unloading only and exclusively to persons duly authorized for the mission. Determination of the payload of the drone and automatic release mechanism, as we have seen previously, the transported payload must be determined with exact precision in order not to run into sanctioning problems for non-compliance with the heavy weights established by national and international regulations at take-off. Also, these rules are in order not to compromise the safety of the mission, nevertheless, the exact determination of the transported weight falls within those calculation needs for the autonomy and the distance that the drone could cover or not. Obviously, as the maximum transportable weight decreases, the increase in the distances that can be traveled and therefore the autonomy can be easily determined with a good approximation.

Figure 5:
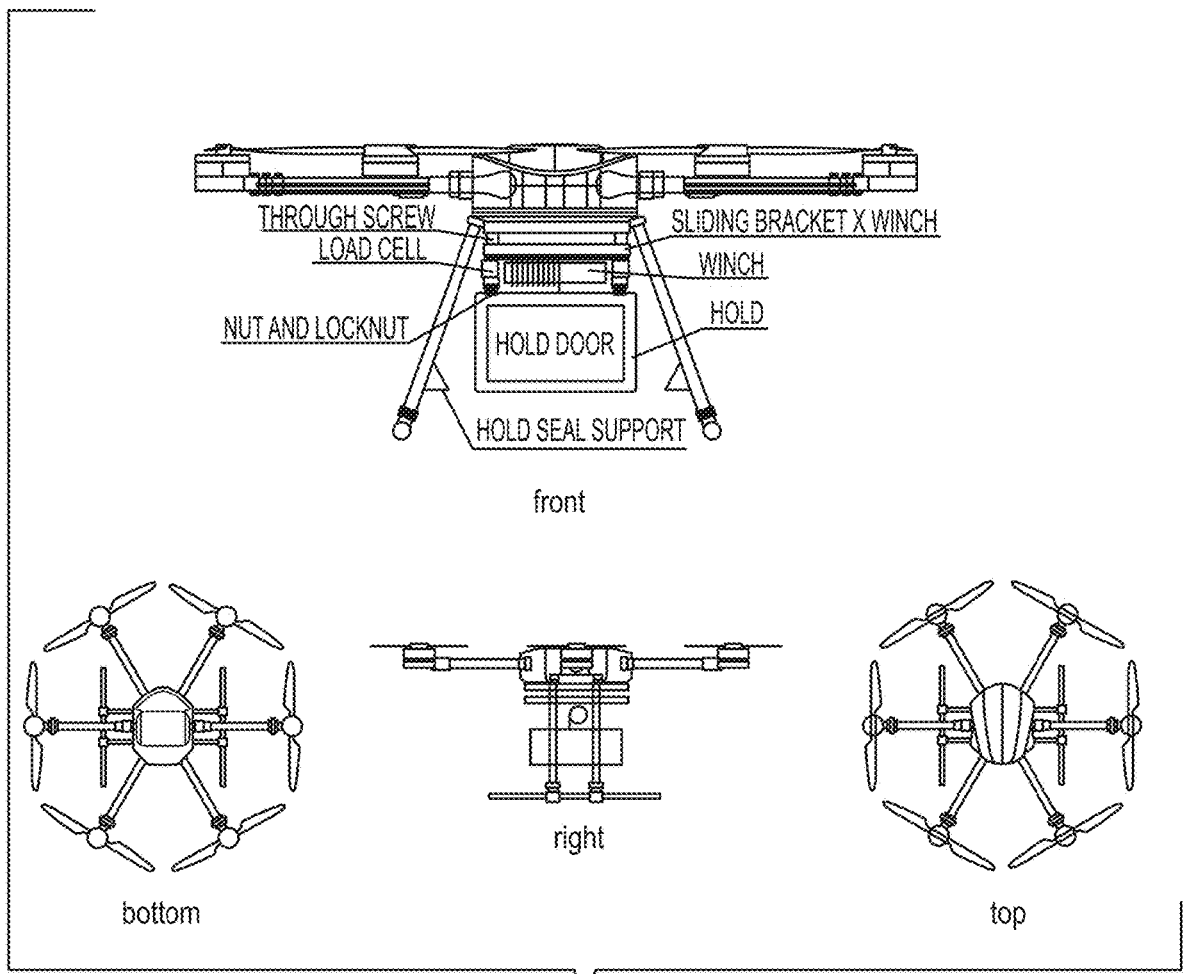
FIG. 5 represents front, bottom, right, and top views of an exemplary UAV.
Figure 6:
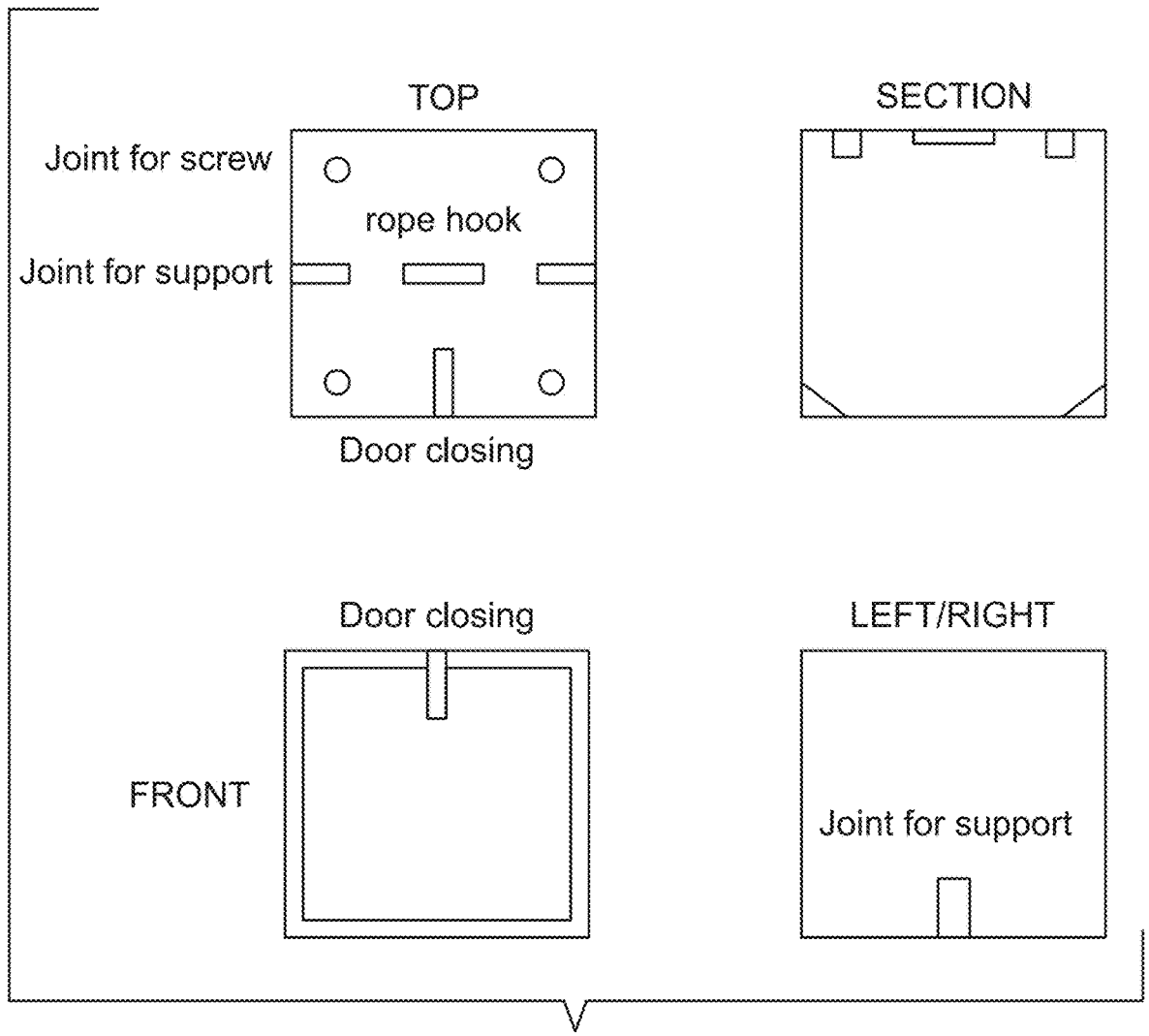
FIG. 6 represents various views of an exemplary hold for the UAV.
Figure 7:
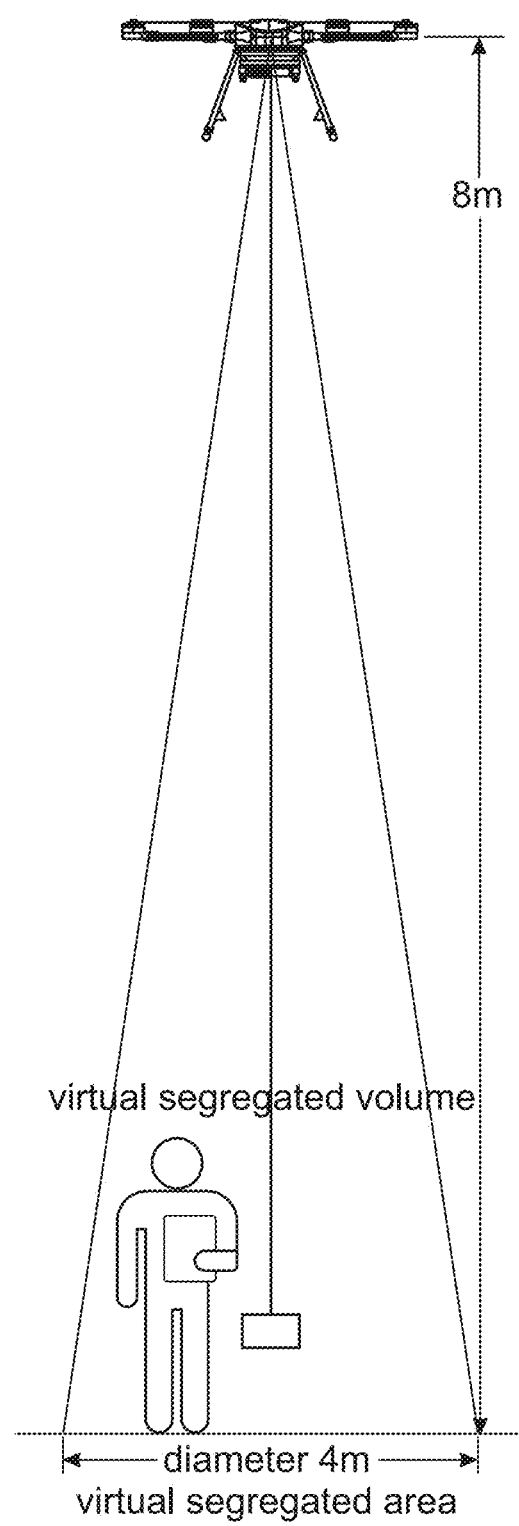
FIG. 7 is a view representing an exemplary virtual segregated area and volume.
Figure 8:
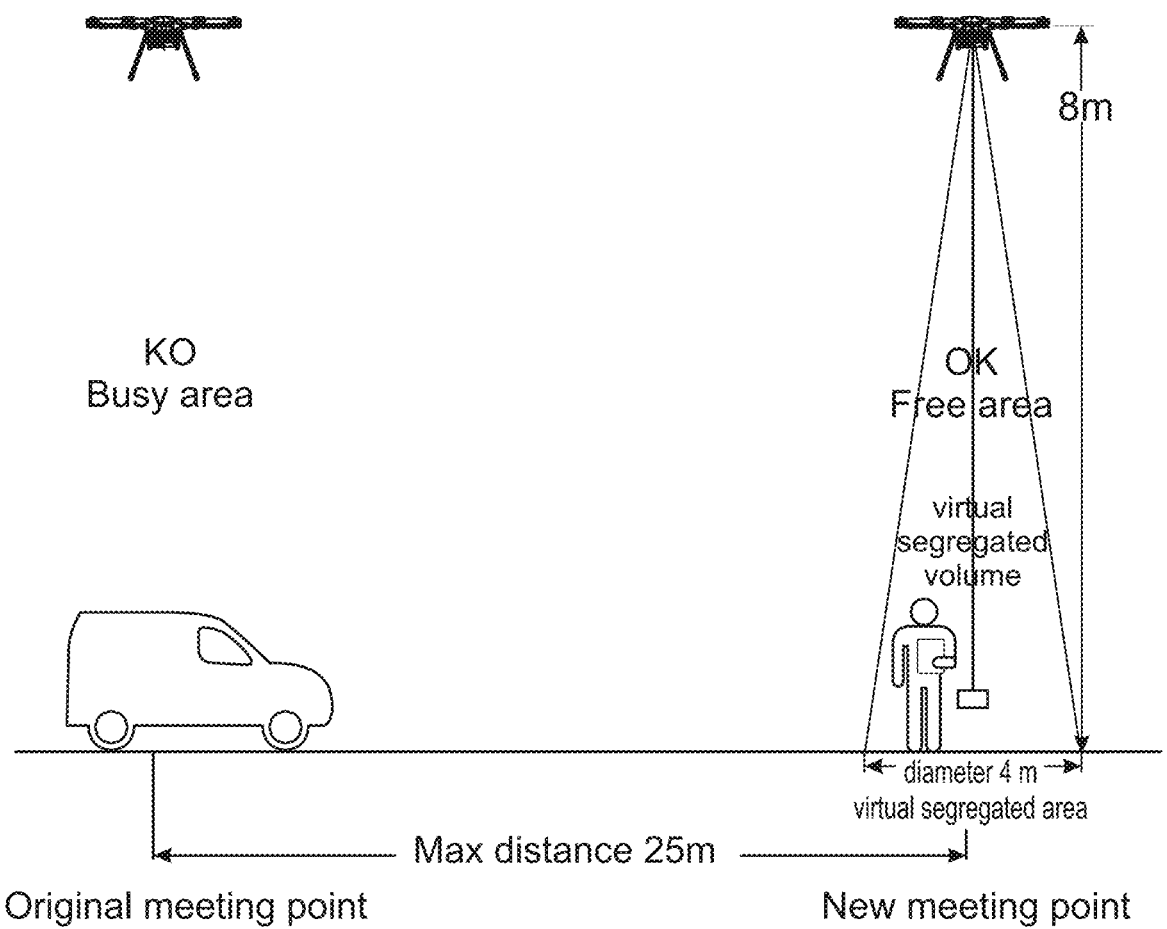
FIG. 8 is a view representing an exemplary following operation from an unusable position to a selected new position for delivery.

As disclosed herein, the applicant has introduced a mechanism that determines the maximum transportable weight by applying a libra that goes to determine the inserted load in the hold set up for the purpose. In the case in question, taking up the technological solutions of digital bathroom scales, see FIG. 5. The winch is mounted in the lower part of the drone with the hook facing the hold downwards. The winch, for example, an RC4WD WINCH Warn, is attached to a quadrangular support plate with four holes near the corners that slide to said plate. Inside the four holes, there are as many screws at whose lower top there are, at each screw, a nut and a sealing lock nut. In the proximity of these four screws, between the plate and the sealing nuts, there are as many load cells that are compressed by the plate and where, as mentioned, the winch. Modern scales may contain a device called a load cell, which is used to measure the weight of an object. The load cell subjected to pressure determines different values of electrical resistance which are suitably processed determining the value of the load. When a weight is placed on a scale, the load cell bends slightly and the electrical signal, which passes through the cell, changes the value based on the pressure or extension of the cell so that the variation of the expressed signal of the cell load be processed and enables to evaluate the load in the hold and therefore evaluate the correspondence to the parameters prescribed for the flight. This phase of verification of the loading process and weight determination is to adequately correspond to the requested services up to the possible escalation of the mission block in the event of non-correspondence of the requested parameters.

Another situation to which the drone platform must correspond will be to any harmful behavior by unauthorized persons who may attempt to get hold of the drone by dragging it down through the pull of the winch rope. In this case, the drone, as we have seen, is programmed to check the weight and therefore in the case of traction higher than the weight value in the hold, with an appropriate mechanism for cutting, unhooking, or releasing the rope. In this case, by adopting automatic release systems arranged on the winch or more simply by letting the winch unwind freely, whose tightness or attachment of the rope to the winch was determined by winding the rope on itself until it had an adequate seal for transport. Also, the winch is built in such a way as to be able to measure the length of the rope used for the mission. This operation is necessary to also find tractions of moderate intensity but continuous and constant aimed at pulling the drone towards the ground. The verification of this value by simply counting the turns of the shunt pulley where the rope is rolled up. The solution relating to the alarm load management is completed with a further application relating to the drone supports which are normally in an oblique position. In the case in question when the hold, utilizing the winch, has been loaded into its housing under the calotte of the drone, the two stands are folded inwards so that the two, one per stand, go to support without overloading the winch or the rope of the winch that would otherwise, to support the hold, and it would be constantly in traction. Obviously, during the unloading phase, the supports will be positioned in an open position so that the hold can be lowered to man level.

FIG. 4 follows a practical realization of the hold, which is equipped with a hatch with closure and special moldings designed to facilitate the holding and grip of the drone during the operating phases.

Determination of the positioning with tracking of UT and CLI by the drone is another fundamental aspect for the implementation of the logistics service using drones in an urban environment. As we have seen, the current missions are carried out with the take-off and landing areas segregated, that is, equipped and manned to prevent access by third parties. This solution in itself is simple and safe, it is extremely expensive given the people necessary for the purpose and this would relegate the use of drones exclusively to life-saving services where the cost to be borne is not taken into consideration, if not minimally. To remedy the economic issues that are described here and therefore to be able to carry out a massive logistics service an alternative solution must be considered.

In an embodiment, to ensure safety and affordability, the applicant intends to perform the services in question always keeping the drones in flight at the time of collection and delivery of the goods, making them land and take off only in suitably equipped vertiports. The system according to the present disclosure, as we have seen after the purchaser and the client have verified their own identity by typing the CRO, allows the drone to drop the hold at the meeting point originally agreed and fixed during the initial phase of the transport order. This condition is the best one hoped for and considered, that is, the mission reflects in a timely and precise manner what was originally planned at the time of purchase. Even if hoped, it is not certain that this can always happen especially in urban areas precisely due to the continuous succession of people from the vehicles or anything else that the area designated for the meeting could be occupied and therefore for these eventualities, it should be tactically resolved the situation.

In such a case, the recipient (purchaser or client) must find a practical and immediate solution. In a nutshell, the situation that arises is similar to what happens when you receive delivery from a courier at your address which, depending on the new contingencies encountered, requires you to be able to move to nearby areas more suitable for the execution of the operation. The same thing may be done with the drone which literally must follow the ground receiver to a new meeting point considered more suitable for carrying out the loading or unloading operations of the hold.

With these assumptions, a system has been implemented where, through a particular algorithm and adequate communications between the drone and the client or the purchaser, their tracking is carried out by the drone in the new position that the client or the purchaser will evaluate as adequate. This operation is always and, in any case, respectful of the various external contingencies; the feasibility of an alternative and internal area; the continuous verification of the drone's flight range. When it comes to external contingencies, the system will in any case be programmed to determine a limit corresponding to a radius from the original meeting point. In the case in question, the applicant deems a radius of maximum length of twenty-five meters adequate, the latter value which will, in any case, be found by the drone or by the PPDD platform.

Failure to comply with this limit may be a reason for canceling the mission and may be appropriately communicated by the system to the user. To do this, by triggering the Bluetooth probes of the drone and the purchaser or client app, to have an exchange of information takes place the CRO code which consists in sending the geographical coordinates corresponding to the smartphone by the purchaser or client so that the drone can go to a stationary flight over the purchaser and the client at a minimum height allowed, in the case described by the applicant equal to eight meters. In this case, the drone appropriately will create a virtual cone that starting from eight meters high will reach the ground covering a circle with a radius of two meters, always according to the intentions of the applicant. In this case, a virtually segregated area/volume will be created that will be occupied exclusively by those who have been authorized to load or unload operations and if the client or the purchaser should move beyond the two meters of radius allowed, the drone and/or the PPDD will appropriately inform the operator in question.

This operation can be assisted by video cameras mounted on the drone which can independently signal the presence of people within the virtually segregated area by verifying in the images, other people, in addition to the person concerned. The drone may ask the same people, through prepared messages, to leave this place and in case of non-compliance cancel the mission. The drone could also operate jointly with the remote operator by sending him the images of the event, leaving him the most suitable decision for the current event. In this case, through the speaker and microphone on the drone, the remote operator will be able to issue the appropriate instructions deciding up to the eventual abandonment of the mission.

Also, the drone, to facilitate the loading and unloading phases and ensure further safety of the operation in progress, can undertake lighting operations of the virtually segregated area, acoustic and/or optical signaling. In this way, people not directly involved in the operation would be invited, in a more or less induced manner to move away from the virtual garrison area. Once the scenario described above has been consolidated, the client or purchaser will give the GO, definitive confirmation to the mission, communicating the order of descent from the hold to the drone. Everything described and listed above may be configured to comply with the SORA (Specific Operations Risk Assessment) requests, as indicated by international regulations which require that only people who are sufficiently informed, prepared, and ready to participate in loading and unloading maneuvers in segregated areas upon execution of the operation. The shadow cone, the virtually segregated volume, which is created, having an apex eight meters high and a ground diameter of four meters, may be considered sufficient to correspond to the safety requirements and compliance required by ENAC or by EASA to that effect.

What is claimed is:
1. A system for directing unmanned aerial vehicles (UAVs) with respect to virtual segregated areas to guarantee safety levels, the system comprising:
 a host platform comprising one or more computing devices;
 one or more unmanned aerial vehicles (UAVs), each UAV comprising:
  a controller;
  a mobile hold connected to the UAV by a winch comprising a cable or rope, wherein the hold is at least vertically moveable with respect to a position of the UAV and the winch is configured to control the descent and ascent of the hold while maintaining the position of the UAV;
  one or more sensors configured to generate output signals representing a weight applied with respect to the mobile hold, and an elevation of the UAV;
 wherein the host platform is configured, upon receiving a request for delivery of one or more goods from a merchant to a customer, to transmit delivery instructions to at least one UAV of the one or more UAVs;
 wherein the at least one UAV is configured, upon arriving at a loading area according to the delivery instructions, to:
  maintain a minimum elevation above the loading area, at least via the output signals representing the elevation of the UAV;
  perform a recognition hand-shake with a first mobile computing device associated with the merchant;
  direct lowering of the mobile hold while maintaining a position of the UAV at or above the minimum elevation above the loading area by vertically extending the cable or rope of the winch to receive a load; and
  confirm a weight of the received load with respect to a maximum weight, at least via the output signals representing the weight applied with respect to the mobile hold;
 wherein the at least one UAV is further configured, upon arriving at a delivery area with the load and according to the delivery instructions, to:
  maintain a minimum elevation above the delivery area, at least via the output signals representing the elevation of the UAV;
  perform a recognition hand-shake with a second mobile computing device associated with the customer;
  direct lowering of the mobile hold while maintaining the position of the UAV at or above the minimum elevation above the delivery area by vertically extending the cable or rope of the winch to deliver the load; and confirm removal of the load, at least via the output signals representing the weight applied with respect to the mobile hold.

2. The system of claim 1, wherein the minimum elevation to be maintained is determined as corresponding to a minimum dimension for a virtual cone originating with the UAV and extending to the loading area or delivery area.

3. The system of claim 2, wherein the minimum dimension comprises a minimum radius of the virtual cone at a ground surface of the loading area or delivery area.

4. The system of claim 2, wherein each UAV comprises at least one imaging device configured to capture images in a field of view at least comprising the virtual cone at a ground surface of the loading area or delivery area.

5. The system of claim 1, wherein the recognition hand-shake with the first mobile computing device and/or the recognition hand-shake with the second mobile computing device comprises authenticating the respective mobile computing device using a unique code generated by the host platform and transmitted to each of the UAV and the respective mobile computing device.

6. The system of claim 5, wherein a unique code is generated by the host platform and shared with each of the UAV and the first mobile computing device upon arrival by the UAV at the loading area.

7. The system of claim 5, wherein a unique code is generated by the host platform and shared with each of the UAV and the second mobile computing device upon arrival by the UAV at the delivery area.

8. The system of claim 5, wherein:
a first unique code is generated by the host platform and shared with each of the UAV and the first mobile computing device upon arrival by the UAV at the loading area;
a second unique code is generated by the host platform and shared with each of the UAV and the second mobile computing device upon arrival by the UAV at the delivery area; and
each of the first unique code and the second unique code are deterministically generated based at least in part on data points associated with the corresponding loading or delivery operation.

9. The system of claim 1, wherein the UAV controller is configured, upon determining that a current weight exceeds a maximum allowable weight, to execute a release operation with respect to the winch.

10. The system of claim 1 wherein the mobile hold comprises:
an opening on one side which can be opened and closed;
appropriate grooves in a lower part where UAV support stands fit together after the stands are closed towards the mobile hold and where further cavities can be arranged in correspondence with a plurality of support screws in a weighing and lifting mechanism.

11. The system of claim 1, wherein the at least one UAV, upon performing the hand-shake operation, and upon receiving instructions from the first mobile computing device or the second mobile computing device that an original loading or delivery area is unusable, is configured to follow the first mobile computing device or the second mobile computing device to a new meeting point.

12. A method to perform loading and delivery services using one or more unmanned aerial vehicles (UAVs), each of the UAVs comprising a controller, a winch comprising a cable or rope to which a mobile hold is connected, and one or more sensors configured to generate output signals representing a weight applied with respect to the mobile hold, and an elevation of the UAV, the method comprising:
upon receiving a request for delivery of one or more goods from a merchant to a customer, transmitting delivery instructions to at least one UAV of the one or more UAVs;
upon the at least one UAV arriving at a loading area according to the delivery instructions:
maintaining a minimum elevation above the loading area, at least via the output signals representing the elevation of the UAV;
performing a recognition hand-shake with a first mobile computing device associated with the merchant;
directing lowering of the mobile hold while maintaining the position of the UAV at or above the minimum elevation above the loading area by extending the cable or rope of the winch to receive a load;
confirming a weight of the received load with respect to a maximum weight, at least via the output signals representing the weight applied with respect to the mobile hold; and
upon the at least one UAV arriving at a delivery area with the load and according to the delivery instructions:
maintaining a minimum elevation above the delivery area, at least via the output signals representing the elevation of the UAV;
performing a recognition hand-shake with a second mobile computing device associated with the customer;
directing lowering of the mobile hold while maintaining the position of the UAV at or above the minimum elevation above the delivery area by vertically extending the cable or rope of the winch to deliver the load; and
confirming removal of the load, at least via the output signals representing the weight applied with respect to the mobile hold.

13. The method of claim 12, wherein the minimum elevation to be maintained is determined as corresponding to a minimum dimension for a virtual cone originating with the UAV and extending to the loading area or delivery area.

14. The method of claim 13, wherein the minimum dimension comprises a minimum radius of the virtual cone at a ground surface of the loading area or delivery area.

15. The method of claim 13, further comprising capturing images in a field of view at least comprising the virtual cone at a ground surface of the loading area or delivery area.

16. The method of claim 15, further comprising suspending or terminating a loading or delivery operation upon detecting, via the captured images, one or more unauthorized persons within the virtual cone.

17. The method of claim 12, wherein the recognition hand-shake with the first mobile computing device and/or the recognition hand-shake with the second mobile computing device comprises authenticating the respective mobile computing device using a unique code transmitted to each of the UAV and the respective mobile computing device.

18. The method of claim 17, wherein:
a first unique code is generated and shared with each of the UAV and the first mobile computing device upon arrival by the UAV at the loading area;
a second unique code is generated and shared with each of the UAV and the second mobile computing device upon arrival by the UAV at the delivery area; and each of the first unique code and the second unique code are deterministically generated based at least in part on data points associated with the corresponding loading or delivery operation.

19. The method of claim 12, further comprising, upon determining that a current weight exceeds a maximum allowable weight, executing a release operation with respect to the winch.

20. The method of claim 12, wherein the at least one UAV, upon performing the hand-shake operation, and upon receiving instructions from the first mobile computing device or the second mobile computing device that an original loading or delivery area is unusable, follows the first mobile computing device or the second mobile computing device to a new meeting point.

* * * * *